United States Patent [19]

Winslow et al.

[11] Patent Number: 5,381,692
[45] Date of Patent: Jan. 17, 1995

[54] BEARING ASSEMBLY MONITORING SYSTEM

[75] Inventors: Christopher L. Winslow, Trumbull; John A. Roncallo, Yalesville; William C. Boyce, Huntington; Robert T. Bonitz, Cheshire; Bruce E. Zepke, Glastonbury; Michael W. Hawman, New Britain, all of Conn.

[73] Assignee: United Technologies Corporation, Hartford, Conn.

[21] Appl. No.: 987,871

[22] Filed: Dec. 9, 1992

[51] Int. Cl.[6] .................. G05G 1/00; G05G 3/00; G08B 21/00
[52] U.S. Cl. .................... 73/593; 340/682; 73/178 H
[58] Field of Search ............ 73/593, 178 H; 374/142, 374/45, 4, 7, 153; 340/682, 683, 679

[56] References Cited

U.S. PATENT DOCUMENTS

| | | | |
|---|---|---|---|
| 3,758,758 | 9/1973 | Games et al. | 340/683 |
| 4,352,293 | 10/1982 | Kurihara et al. | 73/593 |
| 4,960,251 | 10/1990 | Nyman | 340/682 |
| 5,058,434 | 10/1991 | Zaschel | 340/682 |
| 5,140,858 | 8/1992 | Nishimoto et al. | 340/682 |
| 5,149,025 | 9/1992 | Utterback et al. | 340/682 |

*Primary Examiner*—Richard E. Chilcot, Jr.
*Assistant Examiner*—William L. Oen
*Attorney, Agent, or Firm*—Terrance J. Radke

[57] ABSTRACT

A bearing assembly monitoring system provides continuous, real time monitoring of the operating condition of a powertrain support bearing assembly and real time alarm signals indicative of degradation and/or impending catastrophic failure thereof. One embodiment of the monitoring system includes a vibration sensing device, first and second primary temperature sensing devices, an ambient temperature sensing device, vibration and temperature signal processing subcircuits, and an alarm subsystem. The vibration sensing device monitors complex vibration signals emanating from the bearing assembly and provides signals corresponding thereto. The vibration signal processing circuit filters such complex vibration signals to provide a predetermined bandwidth thereof that are converted to stabilized DC voltage signals which are compared to reference voltages corresponding to higher than normal and excessive vibration levels. Exceedance of such reference voltages generates a corresponding vibration alarm signal. The temperature sensing devices monitor the operating and ambient temperatures of the bearing assembly and provide signals corresponding thereto. The temperature signal processing circuit converts such temperature signals to differential temperature signals which are compared to a reference voltage corresponding to a temperature differential indicative of impending catastrophic failure. Exceedance of the reference voltage generates a temperature alarm signal. The alarm subsystem is operative in response to the vibration and/or temperature alarm signals to provide a real time early warning of degradation and/or impending catastrophic failure of the bearing assembly.

13 Claims, 8 Drawing Sheets

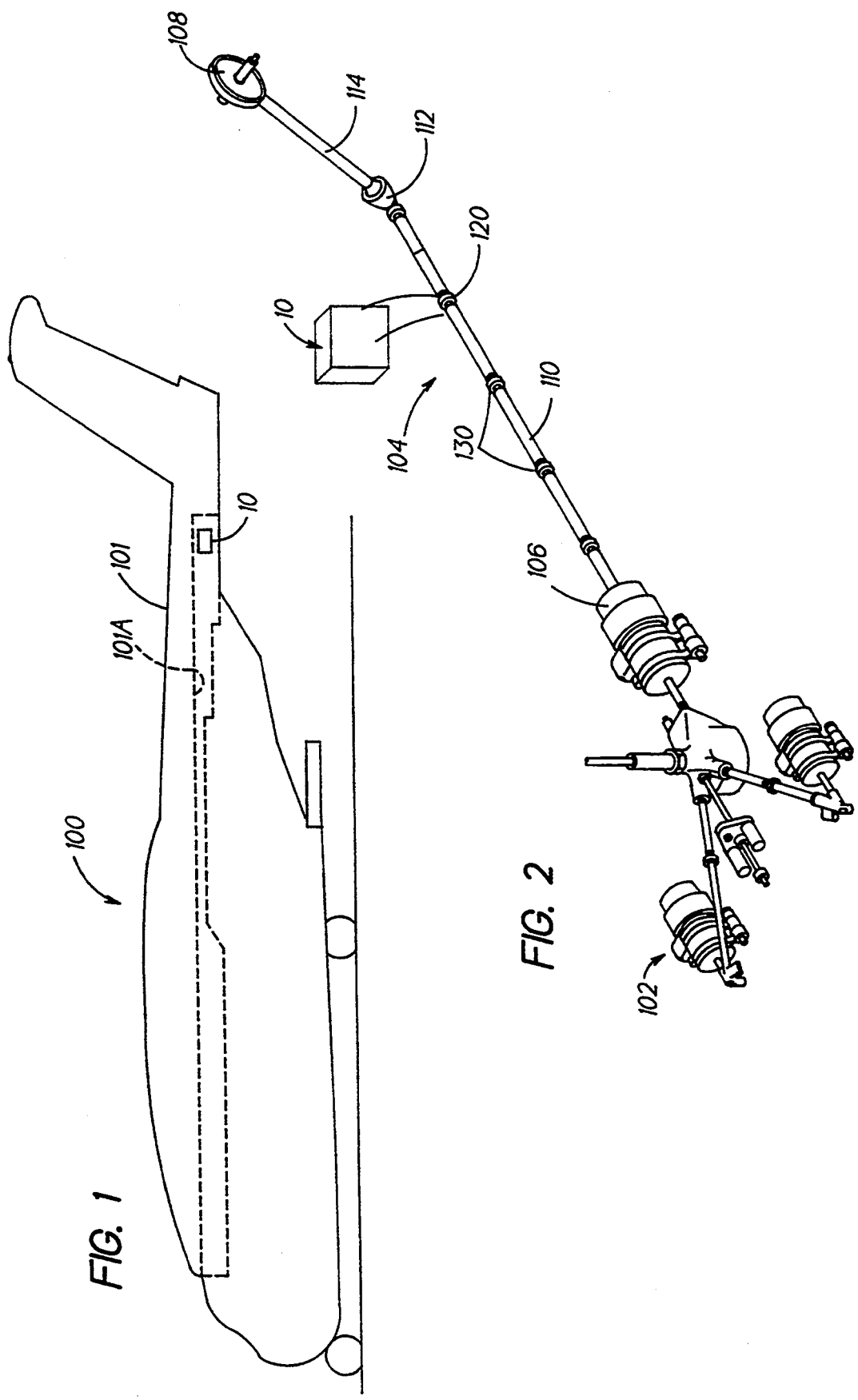

BEARING ASSEMBLY MONITORING SYSTEM

TECHNICAL FIELD

The present invention relates to monitoring systems, and more particularly, to a bearing assembly monitoring system that provides continuous, real time monitoring of the operating condition of power train support bearings and provides real time early warnings of bearing degradation and/or impending catastrophic failure thereof. The bearing assembly monitoring system according to the present invention has particular utility in providing a real time early warning of bearing degradation and/or impending catastrophic failure of the duplex bearing assembly and/or hangar bearing assemblies of a helicopter tail rotor driveshaft.

BACKGROUND OF THE INVENTION

Most helicopters incorporate an empennage-mounted tail rotor system to counteract the torque effects produced by the main rotor system. Proper operation of the tail rotor system is necessary for safe and efficient helicopter flight operations, especially in the hover flight mode.

The tail rotor system is driven by power diverted from the helicopter powerplant, such power being transmitted to the tail rotor system by means of a tail rotor drivetrain. The tail rotor drivetrain includes a primary tail rotor driveshaft that extends between the powerplant and an empennage torque-coupling device, e.g., intermediate gear box, tail rotor gear box, and which is operative to facilitate power transfer to the tail rotor system. The primary tail rotor driveshaft is typically housed within the helicopter boom structure. Due to the length of most primary tail rotor driveshafts, such shafts are rotatably supported within the boom structure by one or more support bearing assemblies, e.g., hangar bearings, duplex bearings.

Such support bearing assemblies represent crucial operating components of the drivetrain that directly affect the proper operation of the tail rotor system. Mechanical degradation of the support bearing assemblies due to bearing defects has a direct negative impact on the operating performance of the tail rotor system. Moreover, such bearing defects, as well as excessive bearing operating temperatures, may lead to catastrophic failure of the affected support bearing assemblies, which, in turn, results in the operational loss of the tail rotor system. Excessive bearing operating temperatures may result from a number of diverse causes, such as inadequate maintenance, e.g., contaminated lubricant, degraded lubricant, inadequate quantity of lubricant, or excessive quantity of lubricant, improperly manufactured bearings, e.g., inadequate retainer to ball clearance, inadequate retainer to race clearance, or inadequate internal clearance, and excessive bearing loads, e.g., improper driveshaft system component assembly (misalignment; out of balance condition), or damaged driveshaft system components (bent; out of balance condition).

Monitoring the health of support bearing assemblies is a paramount concern for safe and efficient helicopter operations. Prior art techniques for monitoring helicopter support bearing assemblies have generally been limited to periodic physical inspections of the respective drivetrain components. Periodic inspections, however, are not necessarily reflective of the actual operating condition of the support bearing assemblies. Furthermore, such static inspections are generally conducted without the benefit of standardized inspection criteria, relying to an unnecessary degree upon the individual skills of maintenance personnel. In consequence, rapid or very slow rates of degradation may not be effectively identified during such periodic inspections.

These physical inspections have been supplemented by the temporary installation of measuring equipment to monitor the operating condition of selected components such as the support bearing assemblies. Utilizing temporarily installed measuring equipment for periodic inspections, however, requires degradation rates greater than the measurement period to be effective such that the utility of such equipment is limited.

A need exists for a bearing assembly monitoring system that provides real time, continuous monitoring of the operating condition of support bearing assemblies, especially support bearing assemblies that comprise helicopter tail rotor drivetrains. The system should be operative to provide real time warnings of bearing degradation and/or impending catastrophic failure. The system should be operative to effectively eliminate false alarms. The system should utilize operating condition parameters that may be readily correlated and standardized to indicate bearing degradation and/or impending catastrophic failure of specific support bearing assemblies.

SUMMARY OF THE INVENTION

One object of the present invention is to provide a bearing assembly monitoring system for continuous, real time monitoring of the operating condition of powertrain support bearings.

Another object of the present invention is to provide a bearing assembly monitoring system that provides real time reporting of bearing degradation and/or impending catastrophic failure of such powertrain support bearings.

Still another object of the present invention is to provide a bearing assembly monitoring system having functional characteristic that effectively eliminate false alarm signals vis-a-vis the bearing operating condition.

These and other objects are provided by a bearing assembly monitoring system according to the present invention that is operative to provide continuous, real time monitoring of the operating condition of powertrain support bearings and that provides real time alarm signals indicative of bearing degradation and/or impending catastrophic failure. The bearing assembly monitoring system according to the present invention provides continuous, real time monitoring of selected complex vibrations and/or temperatures of a support bearing assembly and provides real time early warning of bearing degradation and/or impending catastrophic failure due to bearing defects and/or excessive bearing operating temperatures. The functional characteristics of the bearing assembly monitoring system effectively eliminates false alarm signals.

The bearing assembly monitoring system according to the present invention includes a vibration sensing device and one or more primary temperature sensing devices mounted in combination with the support bearing assembly to provide continuous, real time monitoring of the operating condition thereof, an ambient temperature sensing device, individual signal processing circuits for the vibration and temperature parameters, and an alarm subsystem that provides real time early warning of bearing degradation and/or impending catastrophic failure of the support bearing assembly.

The vibration sensing device is operative to detect complex vibrations emanating from the support bearing assembly and to generate signals corresponding thereto. The vibration signal processing circuit is operative to convert a predetermined bandwidth of such complex vibration signals to stabilized DC voltage signals, to compare such stabilized DC voltage signals to one or more reference voltages indicative of higher than normal and/or excessive vibration levels in the bearing support assembly, and to generate corresponding vibration alarm signals indicative of degradation and/or possible impending catastrophic failure of the support bearing assembly if the stabilized DC voltage signals exceed such reference voltages.

Each primary temperature sensing device is operative to detect the operating temperature of an individual bearing of the support bearing assembly while the ambient temperature sensing device is operative to detect the ambient temperature adjacent the bearing assembly. The temperature signal processing circuit is operative to generate a temperature differential signal for each individual bearing, to compare such signal to a reference voltage defining a temperature differential indicative of impending catastrophic failure of the support bearing assembly, and to generate a temperature alarm signal indicative of impending catastrophic failure of the support bearing assembly if the temperature differential signal exceeds the reference voltage.

The alarm subsystem is operative, in response to the vibration and/or temperature alarm signals from the vibration and/or temperature signal processing circuits, respectively, to activate one or more corresponding cockpit and/or cabin advisory devices to warn of degradation and/or impending catastrophic failure of the duplex bearing assembly. The overall functional characteristics of the bearing assembly monitoring system effectively eliminates false vibration and/or temperature alarm signals, thereby enhancing the reliability of the monitoring system.

BRIEF DESCRIPTION OF THE DRAWINGS

A more complete understanding of the present invention and the attendant features and advantages thereof may be had by reference to the following detailed description when considered in conjunction with the accompanying drawings wherein:

FIG. 1 is a side plan view of a CH-53E helicopter.

FIG. 2 is a perspective view of the tail rotor powertrain of the CH-53E helicopter of FIG. 1.

DETAILED DESCRIPTION OF PREFERRED EMBODIMENTS

Figure 3A:
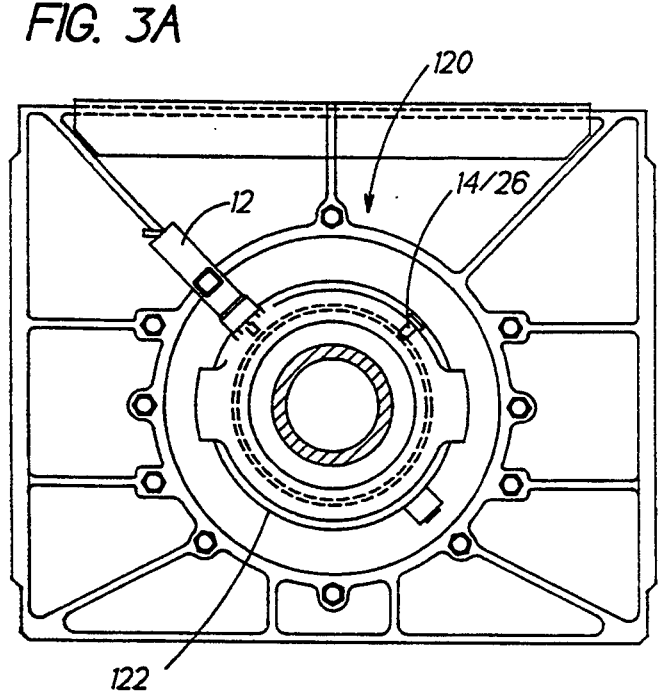
FIG. 3A is a front plan view of the duplex bearing assembly of the CH-53E tail rotor powertrain.

Referring now to the drawings wherein like reference numerals designate identical or equivalent elements throughout the several views, FIGS. 1 and 2 illustrate a Sikorsky CH-53E helicopter 100 and the powerplant 102 and tail rotor powertrain 104 thereof, respectively. Power is diverted from the No. 2 engine 106 to drive the tail rotor (not illustrated), which provides the antitorque forces necessary for operation of the helicopter 100. The tail rotor powertrain 104 is operative to transmit power from the engine 106 to a tail rotor gear box 108, which drives the tail rotor, by means of a primary tail rotor driveshaft 110, an intermediate gear box 112, and a secondary tail rotor driveshaft 114. The primary tail rotor driveshaft 110 is disposed within an airframe tunnel 101A in the boom structure 101 of the helicopter 100. Due to the length of the primary tail rotor driveshaft 110 of the CH-53E helicopter, the driveshaft 110 is rotatably supported by means of a single duplex bearing assembly 120 and a plurality of hangar bearing assemblies 130, as illustrated in FIG. 2.

Figure 3C:
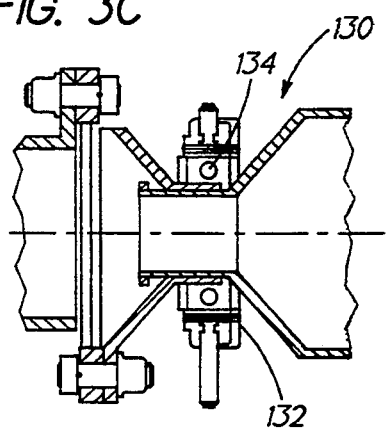
FIG. 3C is a cross-sectional view of an exemplary hangar bearing assembly for the CH-53E tail rotor powertrain.
Figure 3B:
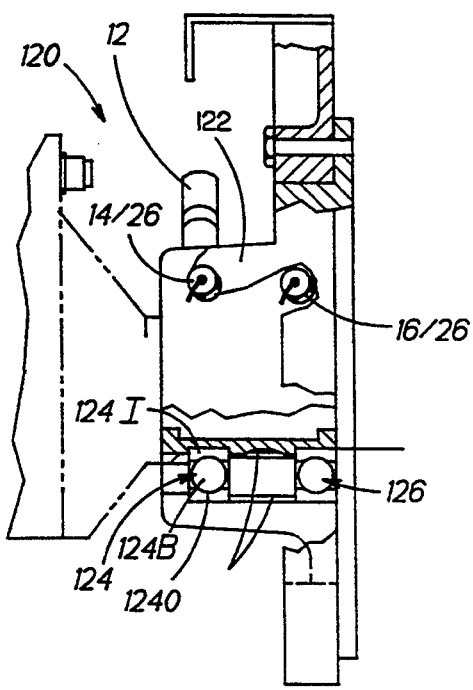
FIG. 3B is a side plan view of the duplex bearing assembly of FIG. 3A.

Such duplex and hangar bearing assemblies 120, 130 are structurally configured for mounting in combination with the airframe, e.g., airframe tunnel 101A bulkheads, of the helicopter 100 so as to provide rotatable support for the primary tail rotor driveshaft 110. An exemplary duplex bearing assembly 120 is illustrated in FIGS. 3A, 3B and includes a bearing housing 122, forward and aft bearings 124, 126 (e.g., ball bearings 124B mounted in inner and outer races 124I, 124O, respectively), and duplex bearing spacers 128. An exemplary hangar bearing assembly 130 is illustrated in FIG. 3C and includes a bearing housing 132 and a single bearing 134.

A bearing assembly monitoring system according to the present invention, as schematically illustrated generally in FIGS. 1, 2 and in further detail in FIGS. 4, 6, 7A, 7B, 9–10, and 12–13, is structurally configured and functionally operative for utilization in combination with the single duplex bearing assembly 120 and/or the hangar bearing assemblies 130 of the helicopter 100. The bearing assembly monitoring system is operative to provide continuous, real time monitoring of the operating condition of the single duplex bearing assembly 120 and/or the hangar bearing assemblies 130 and to provide real time warning signals indicative of bearing degradation and/or impending catastrophic failure. The functional characteristics of the bearing assembly monitoring system effectively eliminate false warning signals.

The bearing assembly monitoring system according to the present invention is described hereinbelow in terms of an embodiment disposed in operative combination with the single duplex bearing assembly 120 of the CH-53E helicopter 100. One skilled in the art will appreciate that the bearing assembly monitoring system according to the present invention may also be used in operative combination with the hangar bearing assemblies 130 of the CH-53E helicopter 100. Further, the bearing assembly monitoring system according to the present invention may be configured for use in operative combination with other rotatably supported shafts such as the No. 2 engine input shaft of the CH-53E helicopter 100, the engine driveshafts of Sikorsky S-70 helicopters (the BLACK HAWK ® helicopter—BLACK HAWK ® is a registered trademark of the Sikorsky Aircraft Division of United Technologies Corporation), the tail rotor driveshaft hangar bearings of S-70 helicopters, the oil cooler blowers of S-70 helicopters, the disconnect jaw bearings of JAYHAWK helicopters (the JAYHAWK helicopter is the Coast Guard variant of the S-70 helicopter), and the engine driveshafts of S-61 helicopters.

One skilled in the art will further appreciate that the bearing assembly monitoring system according to the present invention may also be utilized in combination with other types of bearing assemblies that support rotating shafts. Accordingly, one skilled in the art will appreciate that the bearing assembly monitoring system according to the present invention described hereinbelow may be practiced other than as specifically described herein. Therefore, it is to be understood that the bearing assembly monitoring system according to the present invention is not to be limited by the ensuing detailed description, but only by the scope of the claims appended hereto.

Figure 4:
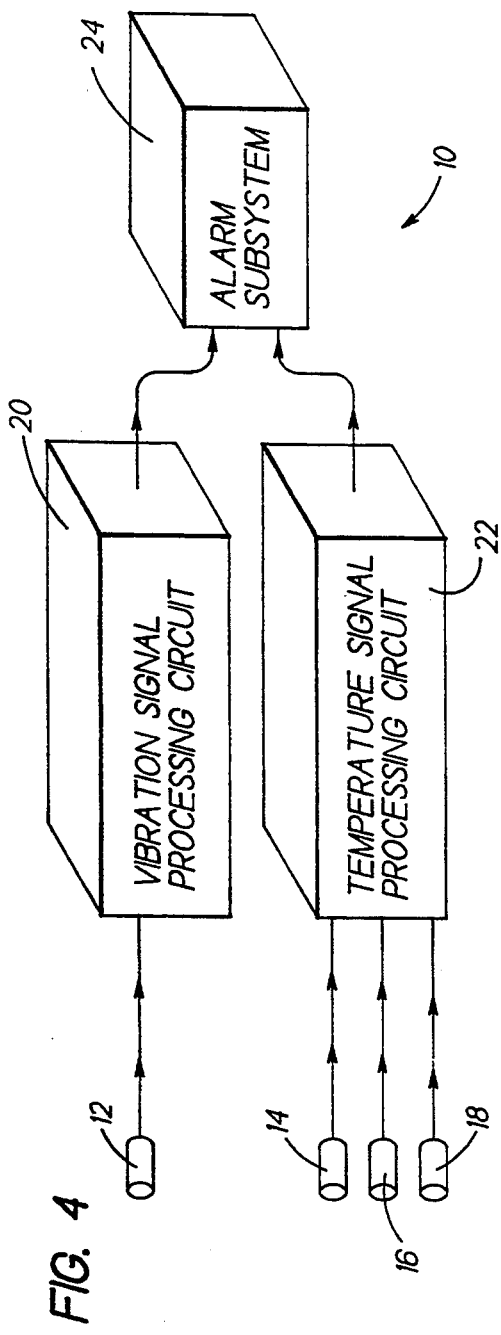
FIG. 4 is a block diagram of a bearing assembly monitoring system according to the present invention.

The embodiment of the bearing assembly monitoring system 10 according to the present invention for the duplex bearing assembly 120 of the CH-53E helicopter 100 is schematically illustrated in FIG. 4 and includes a vibration sensing device 12, primary and ambient temperature sensing devices 14, 16, 18 (one for each of the bearings 124, 126 and one for sensing ambient temperature within the airframe tunnel 101A, respectively), a vibration signal processing circuit 20, a temperature signal processing circuit 22, and an alarm subsystem 24. The bearing assembly monitoring system 10 according to the present invention is operative to provide continuous, real time monitoring of selected complex vibrations emanating from the duplex bearing assembly 120 and to generate signals corresponding thereto by means of the vibration sensing device 12 and to process such complex vibration signals to provide a real time early warning of degradation and/or possible impending catastrophic failure of the duplex bearing assembly 120 due to fatigue wear as a result of bearing defects. The bearing assembly monitoring system 10 according to the present invention is further operative to provide continuous, real time monitoring of bearing operating and ambient temperatures in the duplex bearing assembly 120 and to generate signals corresponding thereto by means of the temperature sensing devices 14, 16, 18 and to process such temperature signals to provide a real time early warning of impending catastrophic failure of the duplex bearing assembly 120 due to excessive operating temperatures therein. The functional characteristics of the bearing assembly monitoring system effectively eliminate false alarm signals.

The vibration sensing device 12 of the bearing assembly monitoring system 10 is operative to detect complex vibrations emanating from the duplex bearing assembly 120 that reflect the operating condition of the bearings 124, 126 and to provide vibration signals corresponding thereto. As the ball bearings of the bearing assembly 120 roll or slide within the inner and outer races thereof, vibrations are generated due to microscopic surface discontinuities, e.g., pits, in the ball bearings and/or races. Such surface discontinuities are inherent in all bearing assemblies due to manufacturing limitations. As the ball bearings and/or races experience surface fatigue and/or corrosion due to operational usage, the size of these surface discontinuities increases. The increase in size of the surface discontinuities causes concomitant increases in the amplitudes of the complex vibrations emanating from the bearing assembly 120. The amplitude increases of the complex vibrations correlate directly to the operating condition of the bearing assembly 120. The bearing assembly monitoring system 10 according to the present invention detects such amplitude increases by means of the vibration sensing device 12 and utilizes such amplitude increases to provide a real time early warning of bearing assembly degradation and/or possible impending catastrophic failure.

Figure 5:
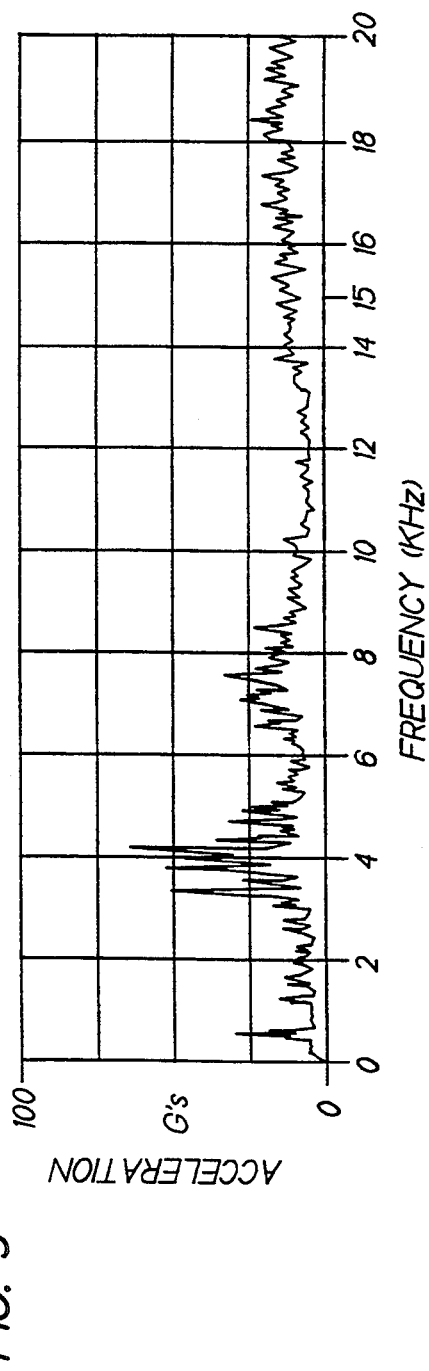
FIG. 5 is an exemplary plot of the vibration frequency spectrum of the housing of the duplex bearing assembly of FIGS. 3A, 3B.

The forcing function engendered by operation of the bearing assembly 120, i.e., the ball bearings impacting the races, induces excitation of natural resonance frequencies of the bearing housing 122, i.e., mechanical resonance. An exemplary plot of the vibration frequency spectrum of the duplex bearing assembly 120 of the CH-53E helicopter 100 is depicted in FIG. 5. The natural resonance frequency band of the duplex bearing assembly 120 is about 4–8 KHz. The inventors determined, however, that this resonance frequency band is not suitable for detecting the complex vibrations representative of the operating condition of the bearings inasmuch as any local vibration, regardless of source, would be amplified by the natural resonance excitation of the bearing assembly 120. For example, adjacent components such as transmission mounted spur gears produce sensible impulsive vibrations that would be amplified at the bearing housing natural resonant frequencies. Amplified extraneous local vibrations would provide false indications of bearing operating condition inasmuch as such vibrations are not correlated with bearing operating condition, but rather are a result of adjacent drive system component impulsive vibrations. As a result, the inventors determined that the mechanical resonant characteristics of the 4–8 KHz natural resonance frequencies of the bearing housing 122 cannot be utilized to detect complex vibrations indicative of the operating condition of the bearing assembly 120.

The inventors selected the vibration signals in the 15–20 KHz bandwidth to detect the complex vibrations indicative of bearing assembly 120 operating condition. Vibrations in the 15–20 KHz bandwidth are localized vibrations, i.e., are not transmitted throughout the aircraft structure, but rather are reflected from bolted/riveted joints, etc. As a result, utilization of the 15–20 KHz bandwidth ensures that the effects of extraneous local vibrations are minimized such that vibrations detected by the vibration sensing device 12 are the complex vibrations reflective of the operating condition of the bearing assembly 120, and not extraneous vibratory influences.

The vibration sensing device 12 for the bearing assembly monitoring system 10 is preferably an accelerometer that is operative over the frequency range of interest. One such accelerometer having utility in the monitoring system 10 according to the present invention is the Model 908T accelerometer produced by Wilcoxon Research Inc. of Gaithersburg, Md. The Model 908T accelerometer includes a low noise internal amplifier and provides a wide bandwidth signal of high fidelity. The 908T accelerometer has an acceleration sensitivity of about 10 Mv/g, an operating temperature range of about $-35°$ C. to about $120°$ C., and is operative over a frequency range of about 2 Hz to about 20 Khz ($\pm 1.5$ dB). The vibration sensing device 12 is secured in combination with the bearing housing 122 by conventional techniques, as exemplarily illustrated in FIGS. 3A, 3B, so as to detect vibrations emanating from the bearing housing 122.

An accelerometer mounted in combination with the bearing housing 122 has a defined sensor mounted resonance frequency. For the 908T accelerometer, the sensor mounted resonance frequency is about 38 Khz. The resonant mounting frequency of the accelerometer also causes local vibrations to be amplified without regard to stimulus source, as discussed hereinabove. Utilization of the 15-20 Khz bandwidth as the operating frequency range for detection of the complex vibrations reflective of the operating condition of the bearing assembly 120 effectively minimizes false indications of bearing operating condition as a result of amplified extraneous vibrations due to the mounted natural frequency of the accelerometer.

Figure 6:
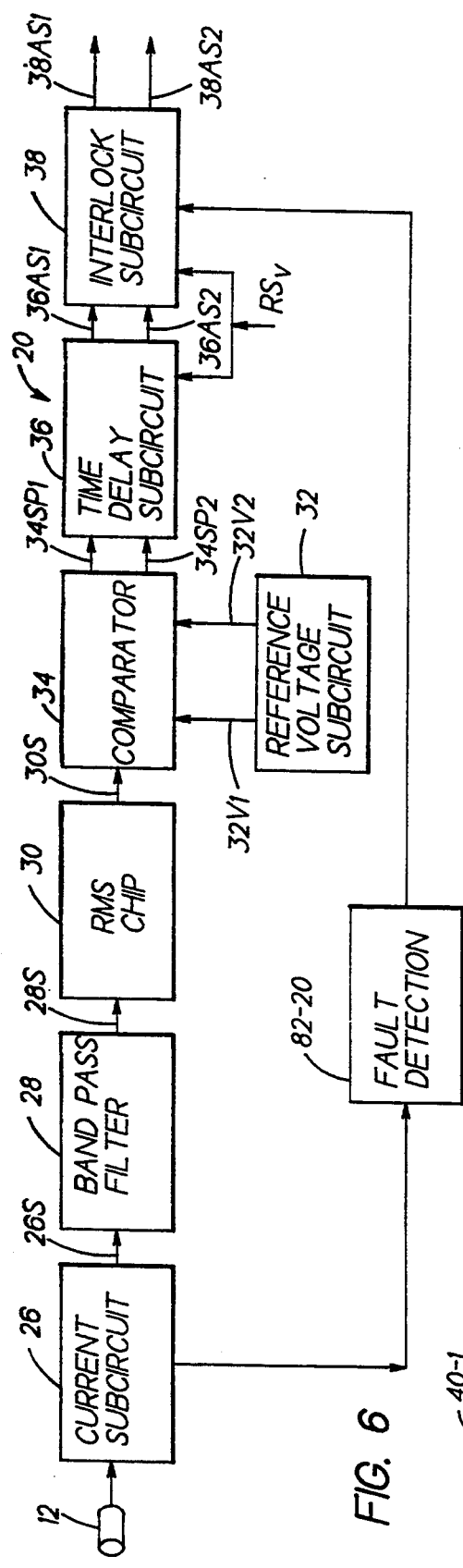
FIG. 6 is a schematic block diagram of one embodiment of a vibration signal processing circuit for the bearing assembly monitoring system of the present invention.
Figure 7A:
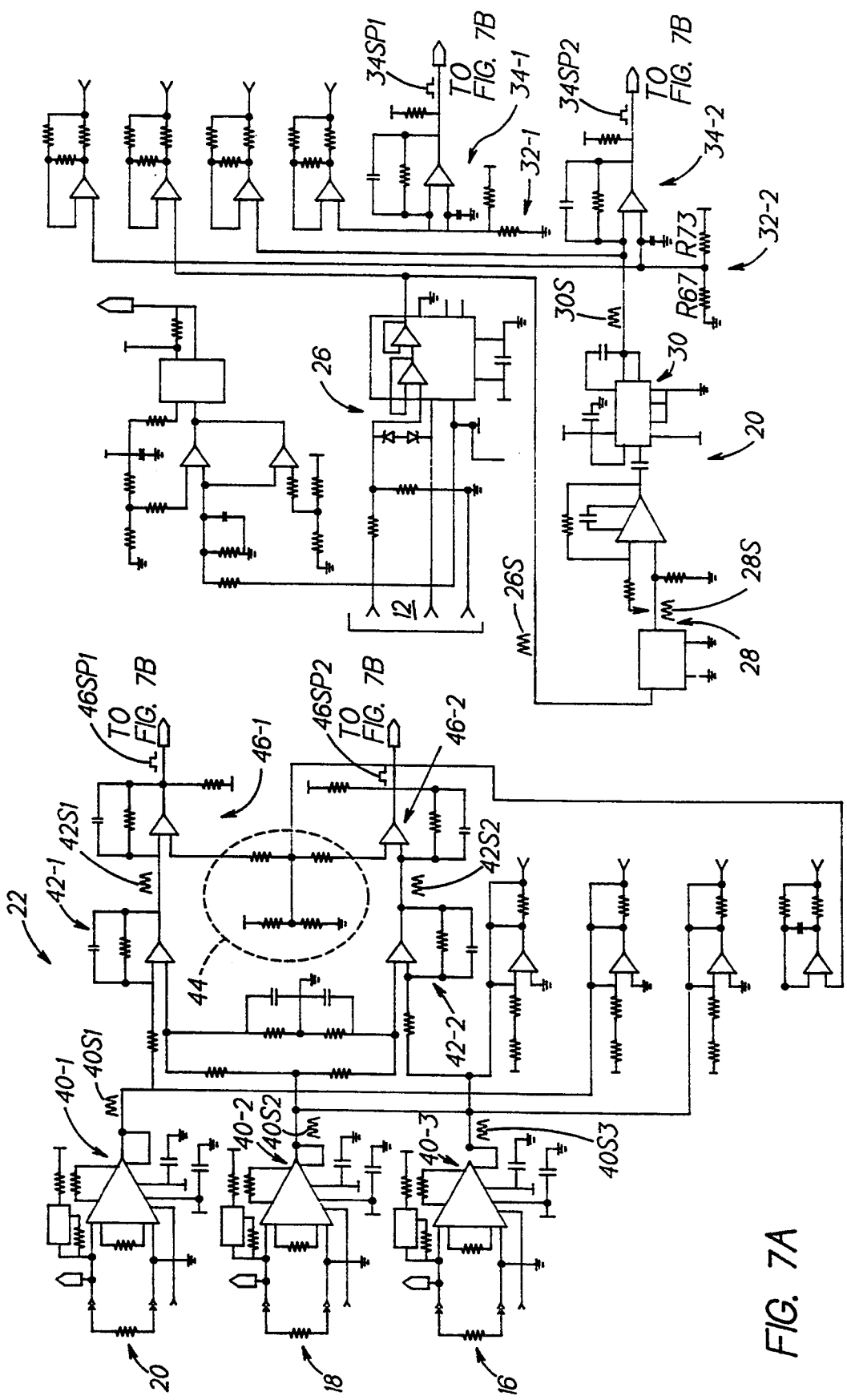
FIGS. 7A, 7B depict a circuit schematic of the vibration and temperature signal processing circuits of the described embodiment of the bearing assembly monitoring system.
Figure 7B:
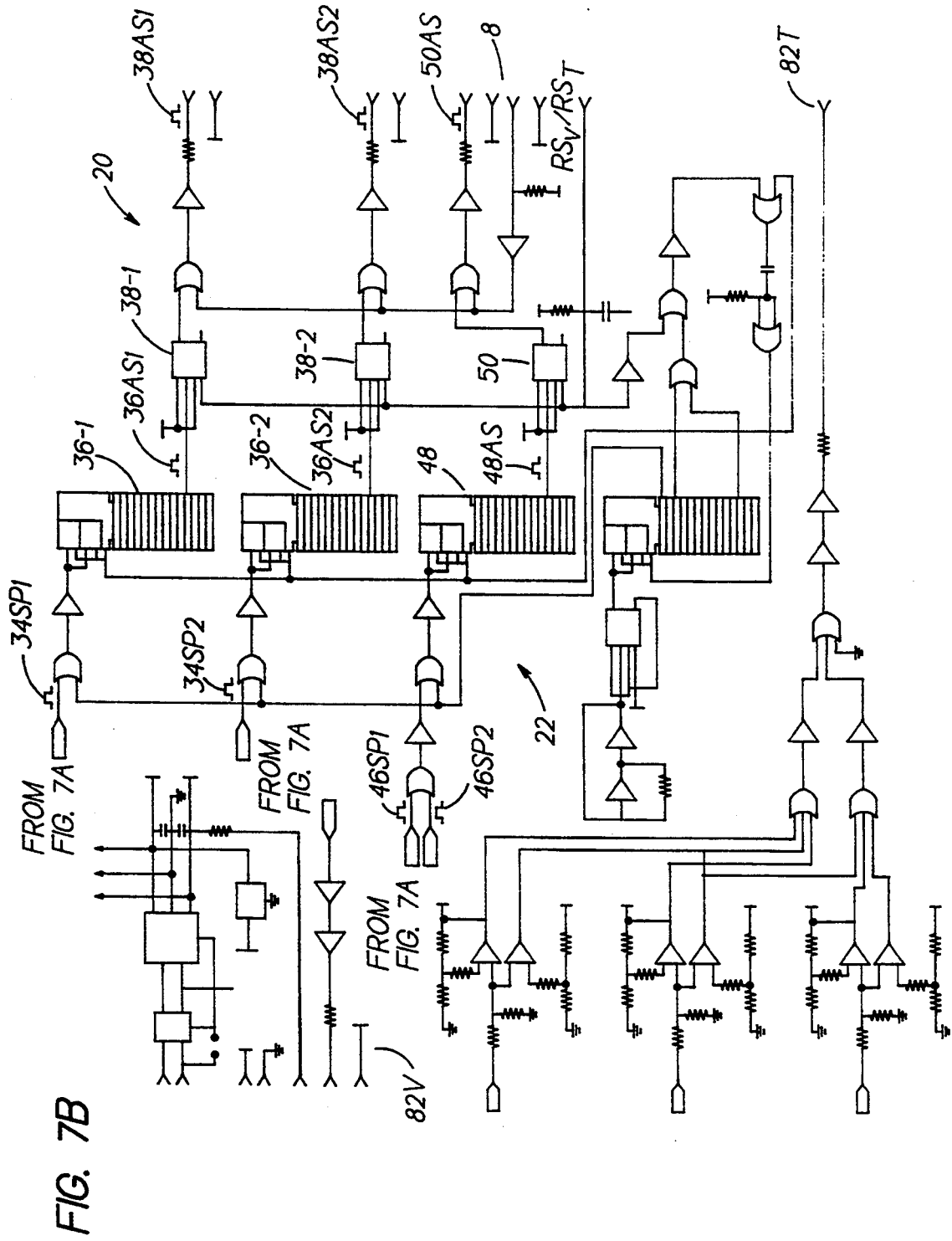

A schematic block diagram of an exemplary embodiment of the vibration signal processing circuit 20 is illustrated in FIG. 6 and a detailed circuit schematic of the vibration signal processing circuit 20 for the described embodiment of the bearing assembly monitoring system 10 is depicted in FIGS. 7A, 7B. The processing circuit 20 includes a current subcircuit 26, a passive bandpass filter 28, an RMS chip 30, a reference voltage subcircuit 32, a comparator 34, a time delay subcircuit 36, and an interlock subcircuit 38. The processing circuit 20 is operative to convert the complex vibratory signals from the vibration sensing device 12 to DC voltage signals and to compare such DC voltage signals to one or more reference voltages. Exceedance of a reference voltage activates the alarm subsystem 24, as described in further detail hereinbelow.

The current subcircuit 26 is operative to generate complex vibration current signals 26S representative of the complex vibrations emanating from the bearing housing 122, as detected by the vibration sensing device 12. The bandpass filter 28 of the described embodiment of the vibration signal processing circuit 20 is operative to pass complex vibration signals 28S in the predetermined bandwidth of 15-20 KHz (see FIG. 5) and to block lower and higher frequency signals (and harmonics thereof) emanating from the bearing assembly, e.g., the ball pass vibration frequency (about 460 Hz for the CH-53E helicopter), the 4-8 KHZ natural resonance vibration frequencies of the duplex bearing assembly 120, the main rotor vibration frequency (about 2.98 Hz for the CH-53E helicopter), the tail rotor vibration frequency, the driveshaft vibration frequency (about 72 Hz for the CH-53E helicopter), and the resonance mounting frequency of the accelerometer (about 38 KHz for the described vibration sensing device 12). The bandpass filter 28 provides "video" quality attenuation (about 5 to 7 poles and $>80$ dB per octave) for out-of-passband signals to reduce leakage of the resonance signals described hereinabove, thereby minimizing the false alarm rate of the vibration processing circuit 20.

The complex vibration signals 28S transmitted by the bandpass filter 28 are converted to DC voltage signals by means of the RMS chip 30. The RMS chip 30 is operative to rectify and smooth the complex vibrations signals 28S to provide stabilized DC voltage signals 30S. Alternatively, a combination of a rectifying diode and a capacitor may be utilized to perform the signal rectifying and smoothing functions, although the RMS chip is preferred over discrete components for stability. The stabilized voltage signals 30S from the RMS chip 30 are transmitted to the comparator 34 (for the described embodiment there are two comparators 34-1, 34-2, as illustrated in FIG. 7A). Each comparator 34 is operative to compare the stabilized DC voltage signals 30S against a corresponding reference voltage provided by the reference voltage subcircuit 32.

Figure 8:
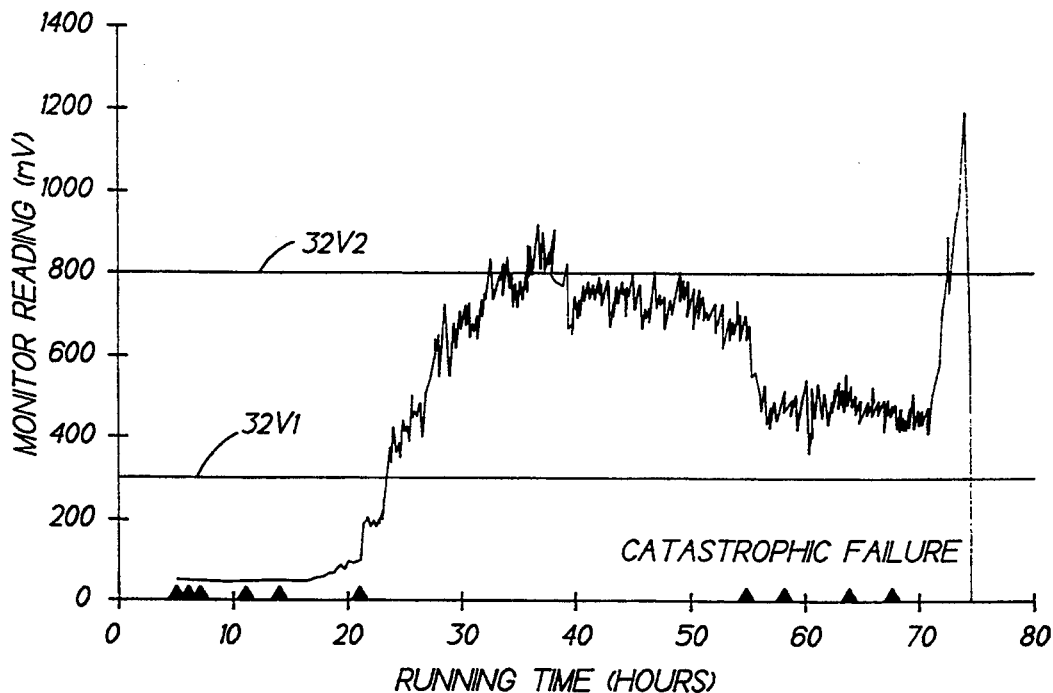
FIG. 8 is a graph depicting the vibration trace of a CH-53E duplex bearing assembly run to catastrophic failure.

The embodiment of the bearing assembly monitoring system 10 described herein has two reference voltage subcircuits 32-1, 32-2 that are operative to provide first and second reference voltages 32V1, 32V2 as illustrated in FIGS. 6, 7A (see also FIG. 8). For the embodiment of the monitoring system 10 described herein, FIG. 8 shows that the first reference voltage 32V1 has a value of about 300 mV and the second reference voltage 32V2 has a value of about 800 mV. (The 300 mV and 800 mV references voltages are based upon empirical test stand data for the bearing assembly monitoring system; corresponding preliminary "field" reference voltages for the bearing assembly monitoring system for the duplex bearing assembly 120 of the CH-53E helicopter are 150 mV$\pm 10$ mV and 600 mV$\pm 10$ mV, respectively).

The reference voltages 32V1, 32V2 provided by the reference voltage subcircuits 32-1, 32-2 may be readily changed by replacing the metallized film resistor in the respective subcircuit (the metallized film resistors are identified as R67, R73 in FIG. 7A). Potentiometers were determined to be unacceptable in light of an inherent self-adjustment characteristic, which reduces overall system reliability and increases the false alarm rate of the system.

The first reference voltage 32V1 defines a "maintenance" condition, which is an indication that the bearing assembly is experiencing vibration levels significantly above new bearing levels (non-critical degradation) and should be inspected by maintenance personnel at the earliest opportunity. The second reference voltage 32V2 defines a "high vibration" condition, which is an indication that the bearing assembly is experiencing excessive vibration levels (for the described embodiment four or more times greater than the vibration levels of new bearings) indicative of abnormal operating conditions. As FIG. 8 exemplifies, the "high vibration" condition may, in some circumstances, indicate an impending catastrophic failure of the bearing assembly.

The comparators 34-1, 34-2 are operative to compare the stabilized DC voltage signals 30S from the RMS chip 30 against the first and second reference voltages 32V1, 32V2, respectively, and to provide corresponding signal pulses 34SP1, 34SP2 whenever the DC voltage output signals 30S exceed the first and/or second reference voltages 32V1, 32V2. To reduce the sensitivity of the bearing assembly monitoring system 10 to drivetrain impulses and transients, i.e., to minimize the false alarm rate of the bearing assembly monitoring system 10, each signal pulse 34SP1, 34SP2 is transmitted to the corresponding time delay subcircuit 36-1, 36-2, as illustrated in FIGS. 6, 7B.

Each time delay subcircuit 36 is operative to provide a corresponding alarm signal 36AS1, 36AS2 if predetermined sampling criteria are met (or exceeded), i.e., a predetermined number of signal pulses 34SP occurring during a predetermined sampling period. For example, for the embodiment of the bearing assembly monitoring system 10 for the duplex bearing assembly 120 of the CH-53E helicopter described herein and as illustrated in FIGS. 7A, 7B, the corresponding alarm signal 36AS1, 36AS2 is generated if 10,000 signal pulses 34SP1 or 34SP2 occur during a twenty second period. Respective alarm signals 36AS1, 36AS2 are transmitted to the interlock circuit 38 (see latches identified by reference numerals 38-1, 38-2 in FIG. 7B) which is operative to provide "set" vibration alarm signals 38AS1, 38AS2 in response to signals 36AS1, 36AS2, respectively. The vibration alarm signals 38AS1, 38AS2 remain set until a reset signal $RS_V$ is transmitted (the reset signal $RS_V$ also resets the respective binary counters comprising the time delay subcircuits 36-1, 36-2, as illustrated in FIGS. 6, 7B). The first and/or second vibration alarm signals 38AS1, 38AS2 activate the alarm subsystem 24, as described in further detail hereinbelow.

The primary temperature sensing devices 14, 16 are operative to detect the operating temperatures of the forward and aft bearings 124, 126, respectively, of the duplex bearing assembly 120. (For an embodiment of the bearing assembly monitoring system for a single bearing assembly such as the hangar bearing 130, only a single primary temperature sensing device is required.). The remaining temperature sensing device 18 is an ambient temperature sensing device that is operative to detect the ambient temperature adjacent the duplex bearing assembly 120, i.e., in the airframe tunnel 101A. The inventors determined that the efficacy of the bearing assembly monitoring system 10 is greatly enhanced if the temperature monitoring function thereof is based upon temperature differentials rather than absolute temperatures. The inventors ascertained that using absolute temperatures in the monitoring system would make the functioning thereof climatic dependent, i.e., bearing operating temperatures in an arctic climate are significantly different from bearing operating temperatures in a desert climate. A monitoring system that is climatic dependent would require recalibration of the temperature signal processing circuit any time significant climatic changes were encountered.

By using temperature differentials, i.e., the difference between the bearing operating temperature and the ambient temperature, the bearing assembly monitoring system 10 according to the present invention is climatic independent. A single predetermined temperature differential, as discussed in further detail hereinbelow, may be established for each particular bearing assembly such that operation of the monitoring system 10 is not affected by variations in climatic temperature conditions, i.e., utilizing temperature differentials inherently compensates for changes in bearing operating and ambient temperatures.

Figure 9:
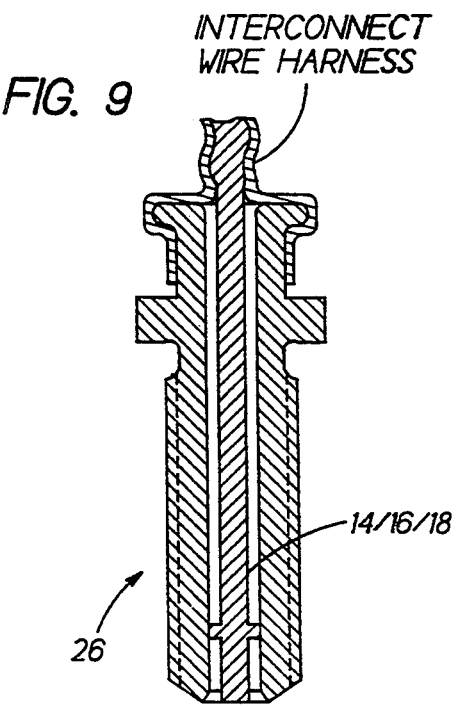
FIG. 9 illustrates a holder for a temperature sensing device.

The temperature sensing devices 14, 16, 18 for the bearing assembly monitoring system 10 may be any conventional temperature sensing device, e.g., resistance temperature detectors (RTDs), thermocouples, although RTDs are preferred. One type of RTD having utility in the monitoring system 10 of the present invention is the Omegafilm series F or series W platinum RTD elements (e.g., Omega Engineering F3131 thin film platinum RTD) available from Minco Products, Minneapolis, Minn. (for the embodiment of the monitoring system 10 described herein, the Minco S261PG RTD). These RTD elements have a temperature operating range of about −50° C. to about 600° C. with 0.1% resistance tolerance. Each of the primary temperature sensing devices 14, 16, 18 is mounted in combination with the duplex bearing assembly 120 and the helicopter airframe, respectively, utilizing a temperature probe mount 26, as illustrated in FIG. 9. The probe mounts 26 containing the primary temperature sensing devices 14, 16 are secured in combination with the bearing housing 122 by conventional techniques so that the temperature sensing devices 14, 16 are disposed adjacent the outer races of the bearings 124, 126, respectively, as exemplarily illustrated in FIGS. 3A, 3B.

Due to the thermal mass of the bearing housing 122 of the duplex bearing assembly 120, the primary temperature sensing devices 14, 16 must be mounted, utilizing the probe mounts 26, immediately adjacent the respective outer races of the bearings 124, 126 for accurate, real time detection of the bearing operating temperatures. Test data has shown, that due to the thermal mass of the bearing housing 122, collocation of the primary temperature sensing devices 14, 16 with the vibration sensing device 12 results in a temperature reporting disparity of about 20° F. and a time delay of about 5 minutes.

However, for bearing assemblies such as the hangar bearing assembly 130, which has a bearing housing 132 of negligible thermal mass, the primary temperature sensing device may be collocatively mounted with the vibration sensing device in combination with the bearing housing 132 (i.e., the temperature sensing device is not located immediately adjacent the race of the bearing 134). Tests have shown that the thermal mass of the bearing housing 132 does not induce temperature reporting disparities or time delays. Collocation of the temperature and vibration sensing devices simplifies the installation of the bearing assembly monitoring system in combination with the bearing assembly.

Figure 10:
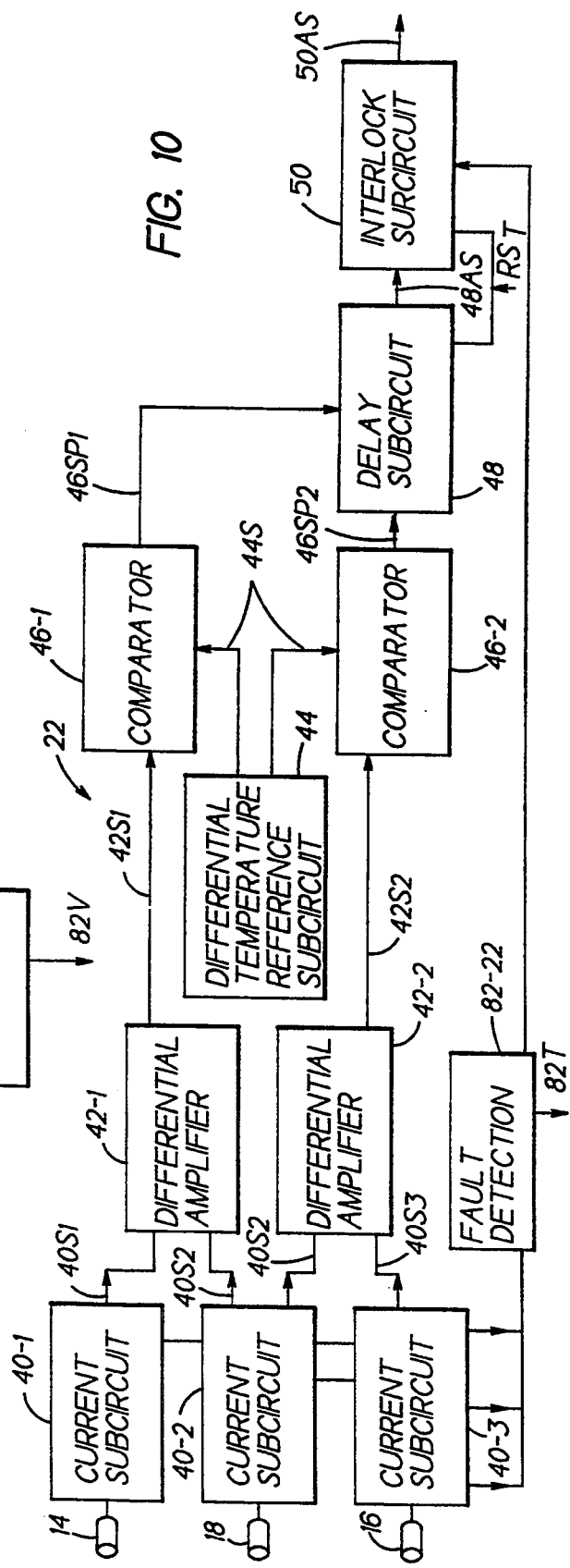
FIG. 10 is a schematic block diagram of one embodiment of a temperature signal processing circuit for the bearing assembly monitoring system of the present invention.

A schematic block diagram of an exemplary embodiment of the temperature signal processing circuit 22 is illustrated in FIG. 10 and a detailed circuit schematic of the temperature signal processing circuit 22 for the described embodiment of the bearing assembly monitoring system 10 is depicted in FIGS. 7A, 7B. The processing circuit 22 includes a precision current subcircuit 40 for each sensing device, a common differential temperature reference subcircuit 44, a common time delay subcircuit 48, a common interlock subcircuit 50 and processing channels for each temperature differential derived from the primary temperature sensing devices 14, 16. Each processing channel includes a differential amplifier 42 and a comparator 46. The temperature signal processing circuit 22 is operative to convert operating temperature signals from the duplex bearing assembly 120 from the respective temperature sensing devices 14, 16, 18, to DC voltage signals (representative of the temperature differential between the respective bearing operating temperatures and the ambient temperature) and to compare such DC voltage signals against a reference voltage (representative of a predetermined temperature differential indicative of impending catastrophic failure of the duplex bearing assembly 120). Exceedance of the reference voltage, i.e., the predetermined temperature differential, activates the alarm subsystem 24, as described in further detail hereinbelow.

Each precision current subcircuit 40 is operative to generate a respective temperature current signal 40S1, 40S2, 40S3 representative of the bearing operating temperatures and the ambient temperature, respectively, as detected by the temperature sensing devices 14, 16, 18. The differential amplifier 42 of each processing channel (see reference numerals 42-1, 42-2 in FIG. 7B) is operative, in response to the DC voltage signals 40S1, 40S2, 40S3, to generate differential DC voltage signals 42S1, 42S2 corresponding to the differentials therebetween, i.e., signals 40S1 and 40S2, 40S3 and 40S2.

The differential temperature reference subcircuit 44 is operative to provide reference voltage signals 44S corresponding to a predetermined temperature differential. The reference voltage signal 44S defines a critical operating temperature differential for the bearing assembly that is indicative of impending catastrophic failure. The predetermined temperature differential is based upon pragmatic observations of specific bearing assemblies and the temperature operating conditions preceding catastrophic failure thereof. The temperature differential may be reflective of excessive bearing operating temperatures as a result of inadequate maintenance, e.g., contaminated lubricant, degraded lubricant, inadequate quantity of lubricant, or excessive quantity of lubricant, improperly manufactured bearings, e.g., inadequate retainer to ball clearance, inadequate retainer to race clearance, or inadequate internal clearance, and/or improper driveshaft system component assembly (misalignment; out-of-balance condition), or damaged driveshaft system components (bent; out-of-balance condition).

Figure 11:
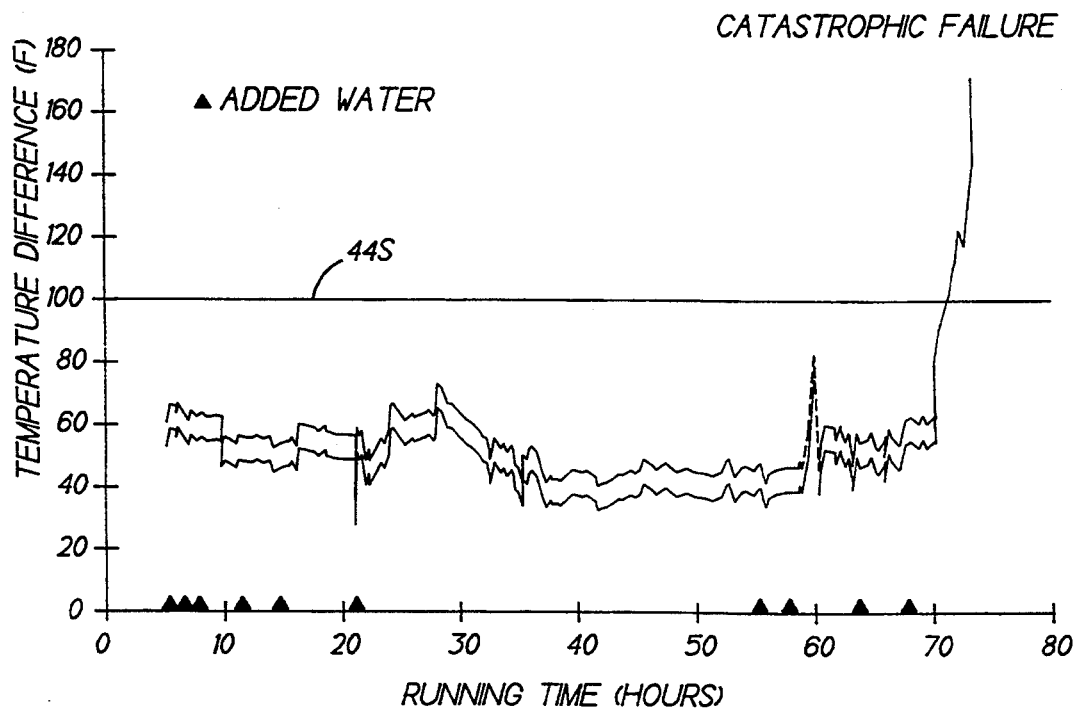
FIG. 11 is a graph depicting the temperature traces of a CH-53E duplex bearing assembly run to catastrophic failure.

Generally, the bearing assemblies for the tail rotor driveshaft of the CH-53E helicopter have a nominal operating temperature differential (in-service bearing operating temperature vis-a-vis ambient temperature) in the range of about 20° F. to about 80° F. Accordingly, the value of the predetermined temperature differential for such bearing assemblies exceeds the value of the nominal operating temperature differential range so as to be reflective of degraded bearing assembly operation, i.e., an excessive bearing operating temperature. For example, as illustrated in FIG. 11, the reference voltage signal 44S for the duplex bearing assembly of the CH-53E helicopter corresponds to a predetermined temperature differential of about 100° F. +15° F./−5° F. (based upon the nominal operating temperature differential range of about 20° F. to about 80° F.).

The comparators 46-1, 46-2 are operative to compare the differential DC voltage signals 42S1, 42S2 of the corresponding processing channels to the reference voltage 44S and to generate signal pulses 46SP1, 46SP2 each time the differential DC voltages 42S1, 42S2 exceed the reference voltage 44S. The signal pulses 46SP1, 46SP2 are fed to the common delay subcircuit 48. Since an excessive operating temperature in either of the bearings 124, 126 represents an impending catastrophic failure of the duplex bearing assembly 120, only a single, common delay subcircuit 48 is required for the temperature signals processing circuit 22.

The time delay subcircuit 48 is operative to reduce the sensitivity of the monitoring system 10 to large magnitude, short-term temperature transients, i.e., minimize the false alarm rate thereof. The delay subcircuit 48 is operative to provide an alarm signal 48AS if the signal pulses 46SP1, 46SP2 meet (or exceed) predetermined sampling criteria. The alarm signal 48AS is transmitted to the interlock circuit 50 (see latch identified by reference numeral 50 in FIG. 7B) which is operative to provide a "set" temperature alarm signal 50AS in response to alarm signal 48AS. The temperature alarm signal 50AS remains set until a reset signal $RS_T$ is transmitted (the reset signal $RS_T$ also resets the binary counter comprising the time delay subcircuit 48, as illustrated in FIGS. 10, 7B). The temperature alarm signal 50AS activates the alarm subsystem 24, as described in further detail hereinbelow.

The alarm subsystem 24 for the bearing assembly monitoring system 10 may comprise one of several alternative embodiments. The basic embodiment of the alarm system 24 is illustrated schematically in FIG. 12 and includes signal coupling means 60 and a set of cockpit advisory devices 62. This embodiment of the alarm subsystem 24 is operative, in response to the first and/or second vibration alarm signals 38AS1, 38AS2 and/or the temperature alarm signal 50AS to activate corresponding cockpit advisory devices 62 to apprise the pilot of a degraded operating condition and/or an impending catastrophic failure of the duplex bearing assembly 120.

The signal coupling means 60 functions as the interface between the vibration and temperature signal processing circuits 20, 22 and the cockpit advisory devices 62. The signal coupling means 60 is operative to couple the first and second vibration alarm signals 38AS1, 38AS2 and the temperature alarm signal 50AS from the vibration signal and temperature signal processing circuits 20, 22, respectively, to the cockpit of the helicopter 100 to activate corresponding cockpit advisory devices 62. The signal coupling means 60 may be any conventional means of transferring signals such as electrical wiring or fiber optic cables.

Figure 12:
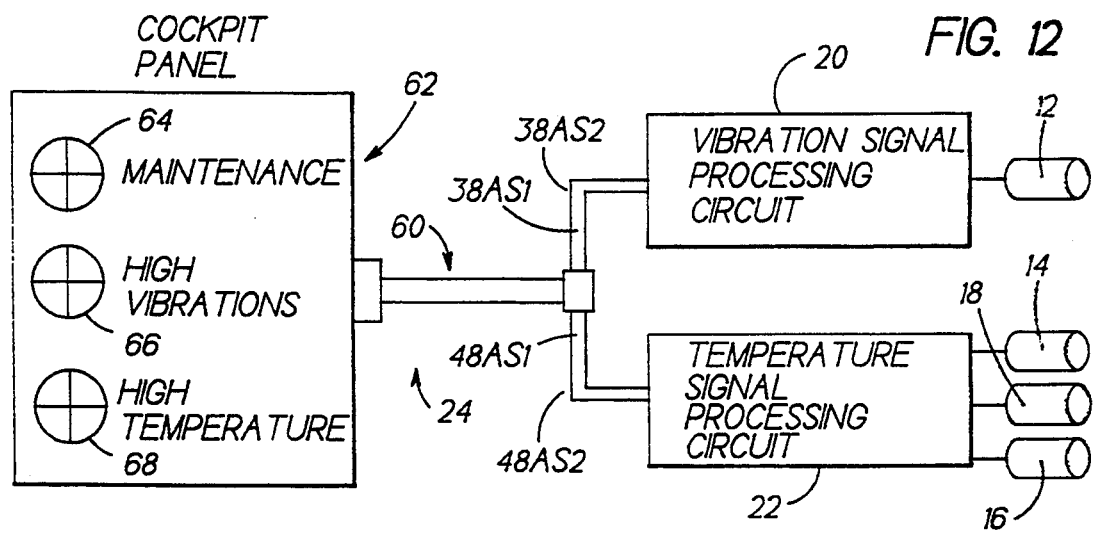
FIG. 12 illustrates one embodiment of an alarm subsystem for the bearing assembly monitoring system.

The cockpit advisory devices 62 include a "Maintenance" advisory light 64, a "High Vibrations" caution light 66, and a "High Temperature" warning light 68 as schematically illustrated in FIG. 12 (see also FIG. 7B). The "Maintenance" advisory light 64 is activated by the first vibration alarm signal 38AS1 and apprises the pilot that the duplex bearing assembly 120 is exceeding nominal vibration levels. The "High Vibrations" caution light 66 is activated by the second vibration alarm signal 38AS2 and apprises the pilot that the duplex bearing assembly 120 is experiencing excessive vibration levels and that there is a concomitant possibility of impending catastrophic failure of the duplex bearing assembly 120. The "High Temperature" warning light 68 is activated by the temperature alarm signal 50AS and apprises the pilot that the duplex bearing assembly 120 is experiencing critical degradation, i.e., impending catastrophic failure.

The cockpit advisory devices 62 described in the previous paragraph may be color-coded to reflect the criticality of the operating condition of the bearing assembly. For example, the "High Temperature" warning light 68 may be red to reflect a critical operating condition, the "High Vibrations" caution light 66 may be orange to reflect a serious (low level critical) operating condition, and the "Maintenance" caution light 64 may be yellow to reflect a non-critical operating condition. Optionally, the cockpit advisory devices 62 may include one or more aural alerting devices (not illustrated) that are operative in combination with the cockpit lights described hereinabove to provide tonal signals in addition to visual signals to the pilot.

Figure 13:
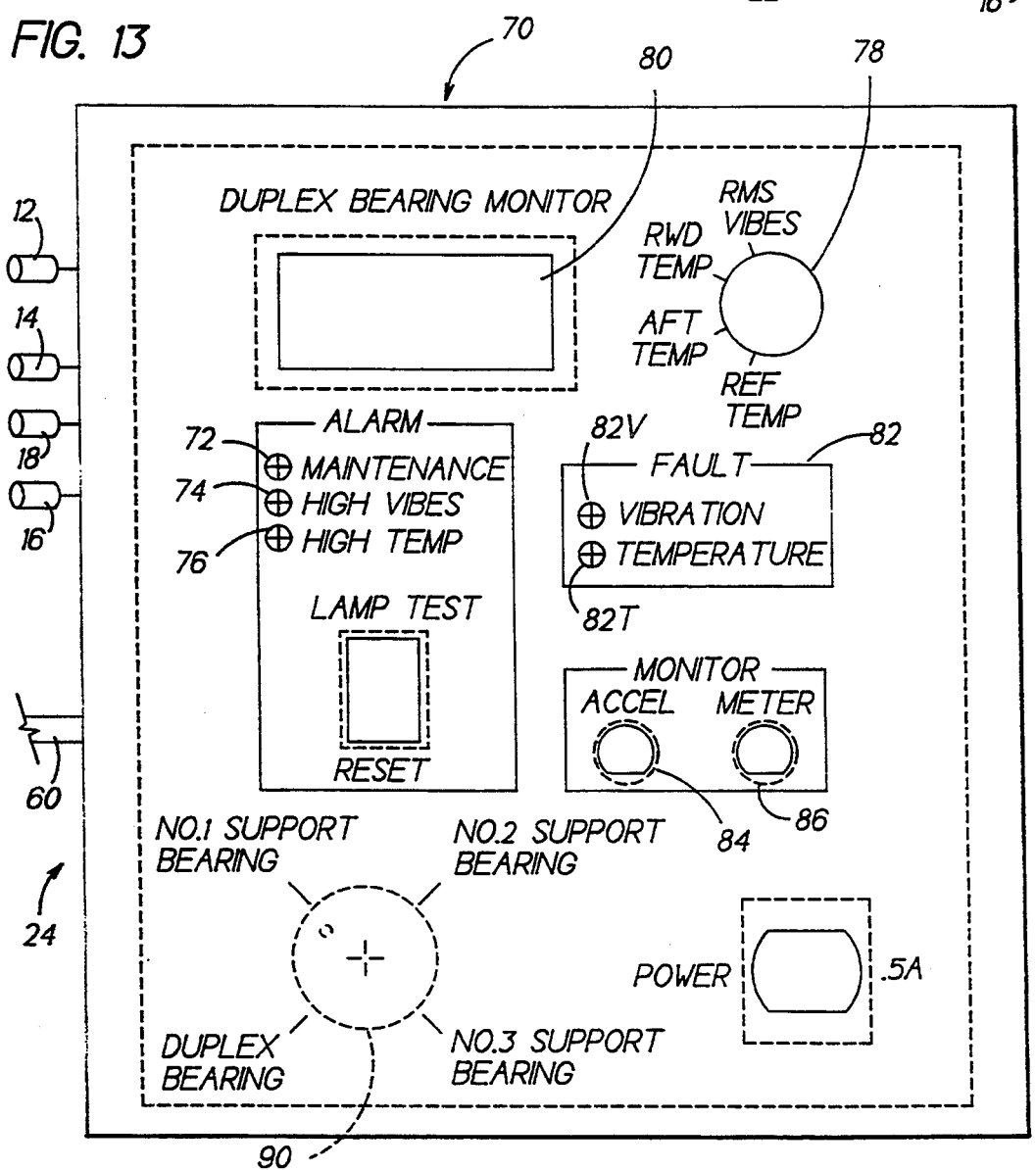
FIG. 13 illustrates another embodiment of an alarm subsystem for the bearing assembly monitoring system.

A more sophisticated embodiment of the alarm subsystem 24 is illustrated in FIG. 13 (see also FIGS. 7A, 7B) and includes an operator's panel 70 in addition to the signal coupling means 60 and the cockpit advisory devices 62 described hereinabove. Physically, the operator's panel 70 is disposed internally within the helicopter 100 so as to be proximal the duplex bearing assembly 120 while concomitantly providing easy access to helicopter flight crew and ground maintenance personnel. The electronic components/circuitry comprising the vibration and temperature signal processing circuits 20, 22 described hereinabove are physically incorporated within the panel 70.

The operator's panel 70 includes a "Maintenance" alarm light 72, a "High Vibes" alarm light 74, and a "High Temp" alarm light 76. These panel 70 alarm lights 72, 74, 76 are functionally equivalent to the "Maintenance" advisory light 64, the "High Vibrations" caution light 66, and the "High Temperature" warning light 68, respectively, described hereinabove and are operative to apprise the helicopter flight crew and/or ground personnel of the operating condition of the duplex bearing assembly 120 in response to the first and second vibration alarm signals 38AS1, 38AS2 and the temperature alarm signal 50AS (see FIG. 7B wherein the alarm signals cause activation of both the corresponding cockpit advisory device 62 and the corresponding panel 70 alarm light). The operator's panel 70 may further include a four-position selector switch 78 and an interconnected digital readout panel 80 for diagnostic display purposes. The four-position selector switch 78 allows the flight crew and/or ground personnel to selectively monitor in real time, via the digital readout panel 80, the vibrational level of the bearing assembly 120 ("RMS VIBES"), the operating temperatures of the forward and aft bearings 124, 126 ("FWD TEMP" "AFT TEMP"), and the ambient temperature ("REF TEMP") (see also FIG. 7A).

The operator's panel 70 may further include fault detection subcircuits 82-20, 82-22 that include a vibration fault light 82V and a temperature fault light 82T (see also FIGS. 6, 7B, 10). The fault detection subcircuits 82 are electrically interfaced with the vibration and temperature signal processing circuits 20, 22 (more specifically, the current subcircuits 26 and 40-1, 40-2, 40-3, respectively) and operative to provide an indication of a malfunction in the corresponding processing circuits 20, 22 (via the vibration and/or temperature fault lights 82V, 82T). The fault detection subcircuits 82-20, 82-22 are further electrically interconnected to the signal processing circuits 20, 22 (more specifically, the interlock circuits 38 and 50, respectively) and further operative, in response to a panel fault (as indicated by the fault lights 82V, 82T) to produce an interlock in the corresponding signal processing circuit 20, 22 such that no corresponding vibration and/or temperature alarm signals 38AS1, 38AS2, 50AS may be generated.

The operator's panel 70 may further include an accelerometer output port 84 and a temperature outpost port 86 that provide the capability for real time recording of buffered raw sensor data from the vibration and/or temperature signal processing circuits 20, 22 for real time analysis and/or recording for subsequent spectrum analysis and/or statistical processing by external equipment. Field maintenance equipment, utilized to perform required maintenance checks/tests that may be related or unrelated to the operating condition of the bearing assembly, may be interfaced through ports 84, 86. For example, a spectrum analyzer may be interfaced through the output port 84 to measure driveshaft balance quality after required periodic disassembly for physical inspection and subsequent reassembly.

A variety of modifications and variations are possible in light of the above teachings. For example, the bearing assembly monitoring system described hereinabove included components and circuitry for continuous, real time monitoring of both vibration and temperature signals of the duplex bearing assembly. Alternative embodiments of the bearing assembly monitoring system may also be based upon the components and circuitry as described hereinabove to provide continuous, real time monitoring of vibration levels only or temperatures only of the duplex bearing assembly. Alternatively, the bearing assembly monitoring system may be operative to produce only a single vibration alarm signal indicative of excessive vibration levels, i.e., high vibrations, in the duplex bearing assembly due to bearing defects. Furthermore, the bearing assembly monitoring system described hereinabove may be utilized in combination with a hangar bearing assembly or other types of powertrain support bearings.

In addition, the bearing assembly monitoring system described hereinabove may be configured to monitor one or more hangar bearings in addition to the duplex bearing assembly. Multiple bearings may be monitored by multiplexing additional sensing devices into the vibration and/or temperature signal processing circuits described hereinabove. Alternatively, multiple bearings may be monitored by replicating the signal processing circuits described hereinabove for use with the additional sensing devices, with a combined output provided to a single display panel. The display panel for such embodiments may be modified to include an additional selector switch (see reference numeral 90 in FIG. 13) that is selectively operative to display data and/or signals from a predetermined bearing assembly.

It is therefore to be understood that, within the scope of the appended claims, the invention may be practiced otherwise than as specifically described hereinabove.

We claim:

1. In combination with a support bearing assembly for a rotating shaft, the support bearing assembly having at least one bearing, a bearing assembly monitoring system, comprising:

vibration sensing means for continuously monitoring complex vibrations emanating from the support bearing assembly and providing complex vibration signals corresponding thereto;

vibration signal processing circuit means operative in response to said complex vibration signals for providing at least one vibration alarm signal;

first temperature sensing means for continuously monitoring the operating temperature of each bearing of the support bearing assembly and providing bearing operating temperature signals corresponding thereto;

second temperature sensing means for continuously monitoring the ambient temperature adjacent the support bearing assembly and providing ambient temperature signals corresponding thereto;

temperature signal processing circuit means operative in response to said bearing operating and ambient temperature signals for providing a temperature alarm signal; and alarm subsystem means operative in response to said at least one vibration alarm signal and said temperature alarm signal for providing real time early warning of degradation of the support bearing assembly as a result of fatigue wear thereof due to excessive vibration levels and impending catastrophic failure of the support bearing assembly due to excessive operating temperature therein, respectively.

2. The bearing assembly monitoring system of claim 1 wherein said vibration signal processing circuit means further comprises:

means for filtering said complex vibration signals to pass a predetermined bandwidth of said complex vibration signals;

means for converting said predetermined bandwidth of said complex vibration signals to DC voltage signals;

means for generating at least one reference voltage indicative of excessive vibration levels in the bearing support assembly, said at least one reference voltage corresponding to degradation of the support bearing assembly; and means for comparing said at least one reference voltage and said DC voltage signals to cause generation of said at least one vibration alarm signal when said DC voltage signals exceed said at least one reference voltage.

3. The bearing assembly monitoring system of claim 2 wherein said comparing means is operative to provide corresponding signal pulses when said DC voltage signals exceed said at least one reference voltage, and wherein said vibration signal processing circuit means further comprises time delay subcircuit means operative in response to said signal pulses to provide said at least one vibration alarm signal if a predetermined number of said signal pulses occur during a predetermined sampling period.

4. The bearing assembly monitoring system of claim 3 wherein said vibration signal processing circuit means is operative to provide a first vibration alarm signal and a second vibration alarm signal, said generating means being operative to generate a first reference voltage indicative of higher than normal vibration levels in the support bearing assembly and a second reference voltage indicative of the excessive vibration levels in the support bearing assembly, said comparing means being operative to compare said DC voltage signals and said first reference voltage to cause generation of said first vibration alarm signal when said DC voltage signals exceed said first reference voltage and to compare said DC voltage signals and said second reference voltage to cause generation of said second vibration alarm signal when said DC voltage signals exceed said second reference, and wherein said alarm subsystem means is operative in response to said first and second vibration alarm signals for providing real time early warning of degradation of the support bearing assembly as a result of fatigue wear thereof due to the higher than normal and excessive vibration levels, respectively.

5. The bearing assembly monitoring system of claim 4 wherein said comparing means is operative to provide corresponding first signal pulses when said DC voltage signals exceed said first reference voltage and to provide corresponding second signal pulses when said DC voltage signals exceed said second reference voltage, and wherein said vibration signal processing circuit means further comprises time delay subcircuit means operative in response to said first and second signal pulses to provide said first vibration alarm signal if a predetermined number of said first signal pulses occur during a predetermined sampling period and to provide said second vibration alarm signal if a predetermined number of said second signal pulses occur during a predetermined sampling period.

6. The bearing alarm monitoring system of claim 1 wherein said temperature signal processing circuit means further comprises:

means for transforming said bearing operating temperature signals and said ambient temperature signals to corresponding differential temperature signals;

means for generating a reference voltage corresponding to a predetermined temperature differential indicative of impending catastrophic failure of the support bearing assembly due to excessive operative temperature; and means for comparing said differential temperature signals and said reference voltage to cause generation of said temperature alarm signal when said differential temperature signals exceed said reference voltage.

7. The bearing assembly monitoring system of claim 6 wherein said comparing means is operative to provide signal pulses when said differential temperature signals exceed said reference voltage, and wherein said temperature signal processing circuit means further comprises time delay subcircuit means operative in response to said signal pulses to provide said temperature alarm signal if a predetermined number of said signal pulses occur during a predetermined sampling period.

8. In combination with a support bearing assembly for a driveshaft of a helicopter, the support bearing assembly having at least one bearing, a bearing assembly monitoring system, comprising:

vibration sensing means for continuously monitoring complex vibrations emanating from the support bearing assembly and providing complex vibration signals corresponding thereto;

vibration signal processing circuit means operative in response to said complex vibration signals for providing at least one vibration alarm signal, said vibration signal processing circuit means including means for filtering said complex vibration signals to pass a predetermined bandwidth of said complex vibration signals, means for converting said predetermined bandwidth of said complex vibration signals to DC voltage signals, means for generating at least one vibration reference voltage indicative of excessive vibration levels in the bearing support assembly, said at least one vibration reference voltage corresponding to degradation of the support bearing assembly, and means for comparing said at least one vibration reference voltage and said DC voltage signals to cause generation of said at least one vibration alarm signal when said DC voltage signals exceed said at least one vibration reference voltage;

first temperature sensing means for continuously monitoring the operating temperature of each bearing of the support bearing assembly and providing bearing operating temperature signals corresponding thereto;

second temperature sensing means for continuously monitoring the ambient temperature adjacent the support bearing assembly and providing ambient temperature signals corresponding thereto;

temperature signal processing circuit means operative in response to said bearing operating and ambient temperature signals for providing a temperature alarm signal, said temperature signal processing circuit means including means for transforming said bearing operating temperature signals and said ambient temperature signals to corresponding differential temperature signals, means for generating a temperature differential reference voltage corresponding to a predetermined temperature differential indicative of impending catastrophic failure of the support bearing assembly due to excessive operative temperature, and means for comparing said differential temperature signals and said differential temperature reference voltage to cause generation of said temperature alarm signal when said differential temperature signals exceed said differential temperature reference voltage; and alarm subsystem means operative in response to said at least one vibration alarm signal and said temperature alarm signal for providing real time early warning of degradation of the support bearing assembly as a result of fatigue wear thereof due to excessive vibration levels and impending catastrophic failure of the support bearing assembly due to excessive operating temperature therein, respectively.

9. The bearing assembly monitoring system of claim 8 wherein said comparing means of said vibration signal processing circuit means is operative to provide corresponding signal pulses when said DC voltage signals exceed said at least one vibration reference voltage, and wherein said vibration signal processing circuit means further comprises time delay subcircuit means operative in response to said signal pulses to provide said at least one vibration alarm signal if a predetermined number of said signal pulses occur during a predetermined sampling period, and further wherein said comparing means of said temperature signal processing circuit means is operative to provide signal pulses when said differential temperature signals exceed said differential temperature reference voltage, and wherein said temperature signal processing circuit means further comprises time delay subcircuit means operative in response to said signal pulses to provide said temperature alarm signal if a predetermined number of said signal pulses occur during a predetermined sampling period.

10. The bearing assembly monitoring system of claim 8 wherein said vibration signal processing circuit means is operative to provide a first vibration alarm signal and a second vibration alarm signal, said generating means of said vibration signal processing circuit means being operative to generate a first vibration reference voltage indicative of higher than normal vibration levels in the support bearing assembly and a second vibration reference voltage indicative of the excessive vibration levels in the support bearing assembly, said comparing means of said vibration signal processing circuit means being operative to compare said DC voltage signals and said first vibration reference voltage and to provide corresponding first signal pulses when said DC voltage signal exceeds said first vibration reference voltage, said comparing means being further operative to compare said DC voltage signals and said second vibration reference voltage and to provide corresponding second signal pulses when said DC voltage signals exceed said second vibration reference signal, and wherein said vibration signal processing circuit means further comprises time delay subcircuit means operative in response to said first and second signal pulses to provide said first vibration alarm signal if a predetermined number of said first signal pulses occur during a predetermined sampling period and to provide said second vibration alarm signal if a predetermined number of said second signal pulses occur during a predetermined sampling period, and further wherein said alarm subsystem means is operative in response to said first vibration alarm signal, said second vibration alarm signal, and said temperature alarm signal to provide early warning of degradation of the support bearing assembly as a result of fatigue wear thereof due to higher than normal vibration levels, to provide early warning of degradation of the support bearing assembly as a result of fatigue wear thereof due to excessive vibration levels, and to provide early warning of impending catastrophic failure of the bearing support assembly due to excessive operating temperature therein, respectively.

11. The bearing assembly monitoring system of claim 8 wherein said alarm subsystem means comprises:

cockpit advisory devices activated in response to said at least one vibration alarm signal and said temperature alarm signal to provide said real time early warning of degradation of the support bearing assembly as a result of fatigue wear thereof due to excessive vibration levels and impending catastrophic failure of the support bearing assembly due to excessive operating temperature therein, respectively; and signal coupling means interfaced with said vibration signal processing circuit means, said temperature signal processing circuit means, and said cockpit advisory devices for coupling said at least one vibration alarm signal and said temperature alarm signal from said vibration signal processing circuit means and said temperature signal processing circuit means, respectively, to said respective cockpit advisory devices.

12. The bearing assembly monitoring system of claim 10 wherein said alarm subsystem means comprises:

cockpit advisory devices activated in response to said first and second vibration alarm signals and said temperature alarm signal to provide said real time early warning of degradation of the support bearing assembly as a result of fatigue wear thereof due to higher than normal vibration levels, to provide said real time early warning of degradation of the support bearing assembly as a result of fatigue wear thereof due to excessive vibration levels, and to provide real time early warning of impending catastrophic failure of the support bearing assembly due to excessive operating temperature therein, respectively; and signal coupling means interfaced with said vibration signal processing circuit means, said temperature signal processing circuit means, and said cockpit advisory devices for coupling said first and second vibration alarm signals and said temperature alarm signal from said vibration signal processing circuit means and said temperature signal processing circuit means, respectively, to said respective cockpit advisory devices.

13. The bearing assembly monitoring system of claim 8 wherein said alarm subsystem means comprises:

panel box means disposed within the helicopter for easy access for housing said vibration and temperature signal processing circuit means; and alarm light means disposed in combination with said panel box means and activated in response to said at least one vibration alarm signal and said temperature alarm signal for providing said real time early warning of degradation of the support bearing assembly as a result of fatigue wear thereof due to excessive vibration levels and impending catastrophic failure of the support bearing assembly due to excessive operating temperature therein, respectively.

* * * * *